US010360389B2

(12) United States Patent
Ali et al.

(10) Patent No.: US 10,360,389 B2
(45) Date of Patent: Jul. 23, 2019

(54) COMPOSITE DOCUMENT ACCESS

(71) Applicant: HEWLETT-PACKARD DEVELOPMENT COMPANY, L.P., Houston, TX (US)

(72) Inventors: Vali Ali, Houston, TX (US); Helen Balinsky, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 101 days.

(21) Appl. No.: 15/307,015

(22) PCT Filed: Jun. 24, 2014

(86) PCT No.: PCT/US2014/043803
§ 371 (c)(1),
(2) Date: Oct. 27, 2016

(87) PCT Pub. No.: WO2015/199654
PCT Pub. Date: Dec. 30, 2015

(65) Prior Publication Data
US 2017/0098090 A1 Apr. 6, 2017

(51) Int. Cl.
*G06F 21/60* (2013.01)
*G06F 17/21* (2006.01)
(Continued)

(52) U.S. Cl.
CPC .......... *G06F 21/602* (2013.01); *G06F 17/21* (2013.01); *G06F 21/10* (2013.01); *H04L 63/105* (2013.01); *G06F 2221/2107* (2013.01)

(58) Field of Classification Search
CPC .... G06F 21/6209; G06F 21/10; G06F 21/602; G06F 21/6218; G06F 2221/2141;
(Continued)

(56) References Cited

U.S. PATENT DOCUMENTS 5,892,900 A * 4/1999 Ginter ................... G06F 21/10
726/26
6,598,161 B1 * 7/2003 Kluttz ............... G06F 21/6209
713/166
(Continued)

FOREIGN PATENT DOCUMENTS

CN 103098071 5/2013
CN 103109300 5/2013

OTHER PUBLICATIONS

Balinsky, Helen Y., and Steven J. Simske. "Differential access for publicly-posted composite documents with multiple workflow participants." Proceedings of the 10th ACM symposium on Document engineering. ACM, 2010. (Year: 2010).*

*Primary Examiner* — Michael Simitoski
(74) *Attorney, Agent, or Firm* — HPI Patent Department (57) ABSTRACT

According to one example, a first computer system receives at least one request by at least one workflow participant to access a composite document content-part from a second computer system. The first computer system retrieves at least one encrypted bundle from the composite document for the at least one workflow participant, decrypts the encrypted bundle using a private key, and ascertains whether at least one rule retrieved from the decrypted bundle is satisfied. In the event that at least one rule is satisfied, the first computer system releases a token from the decrypted bundle to the second computer system to access the composite document content-part.

17 Claims, 6 Drawing Sheets

(51) Int. Cl.
  *G06F 21/10* (2013.01)
  *H04L 29/06* (2006.01)
  *G06F 12/14* (2006.01)

(58) Field of Classification Search
  CPC ........... H04N 21/4627; H04N 21/2541; H04N 21/26613; H04N 21/8355; G06Q 10/103; G06Q 20/1235; H04L 2463/101; H04L 63/10; H04L 63/104; H04L 2209/60; H04L 2209/603; H04L 29/06; H04L 63/0428; H04L 63/0442
  See application file for complete search history.

(56) References Cited

U.S. PATENT DOCUMENTS

| | | | |
|---|---|---|---|
| 7,113,912 B2 | 9/2006 | Stefik et al. | |
| 7,380,120 B1 | 5/2008 | Garcia | |
| 8,032,921 B2 | 10/2011 | Takenaka et al. | |
| 9,183,406 B2* | 11/2015 | England | G06F 21/6218 |
| 2002/0007456 A1 | 1/2002 | Peinado et al. | |
| 2002/0128856 A1* | 9/2002 | Stefik | G06F 21/10 |
| | | | 705/300 |
| 2002/0194485 A1* | 12/2002 | Ram | G06F 21/10 |
| | | | 713/193 |
| 2005/0039034 A1* | 2/2005 | Doyle | H04L 9/0825 |
| | | | 713/193 |
| 2007/0169168 A1 | 7/2007 | Lim | |
| 2008/0162603 A1 | 7/2008 | Garg et al. | |
| 2008/0270807 A1 | 10/2008 | Forlenza et al. | |
| 2009/0112868 A1 | 4/2009 | Rajamani et al. | |
| 2010/0299763 A1 | 11/2010 | Marcus et al. | |
| 2012/0089841 A1 | 4/2012 | Boyer et al. | |
| 2012/0185701 A1* | 7/2012 | Balinsky | G06F 21/6209 |
| | | | 713/193 |
| 2012/0290849 A1* | 11/2012 | Simske | H04L 9/3247 |
| | | | 713/189 |
| 2012/0303968 A1* | 11/2012 | Balinsky | H04L 9/14 |
| | | | 713/189 |
| 2013/0124868 A1* | 5/2013 | Sorotokin | G06F 21/10 |
| | | | 713/176 |
| 2013/0174216 A1* | 7/2013 | Simske | G06F 21/6209 |
| | | | 726/1 |
| 2013/0198255 A1 | 8/2013 | Balinsky et al. | |
| 2013/0246799 A1* | 9/2013 | Balinsky | H04L 9/3247 |
| | | | 713/176 |
| 2014/0082095 A1* | 3/2014 | Balinsky | G06Q 10/0633 |
| | | | 709/206 |

* cited by examiner

COMPOSITE DOCUMENT ACCESS

BACKGROUND

The creation, distribution, and exchange of digital documents has become a commonly accepted alternative to printing documents, both for purposes of efficiency and for environmental purposes Examples of digital documents that may be created, distributed, or otherwise exchanged include, for instance, electronic word processing documents, electronic spreadsheets, electronic presentations, electronic drawings, portable document format (PDF) files, and web pages e.g., HTML, CSS, or other web format files.

Many digital documents have become a mixture, or a composite, of separate parts created in differing file formats. Different parts may be combined together through various serialization mechanisms such as a Java jar-archive, or an HP DLF file. One example of a composite document is a business proposal document including product images as JPEG files, a marketing video clip as a MOV file, a PowerPoint presentation as a PPT file, and a financial details spreadsheet as an XLS file. Composite documents may be prevented to a user through specialized software as a single editable, browsable, searchable, approvable, or usable document.

DETAILED DESCRIPTION

In an example, a composite document, an authoring environment, a secure content manager, a trusted agent, an encrypted bundle, and the accessing of secure content-parts of a composite document are disclosed.

More specifically, in an example, composite document access enables a composite document to be accessed based on conditions or rules stored in, e.g., encrypted bundles. For example, composite document conditions or rules may include, without limitation, any run-time verifiable constraints such as time, location, session, state, and status (e.g., whether a participant has signed-in). In an example, the conditions or rules may be embedded into a composite document or stored in a database, and may be accessible by a trusted agent, e.g., by a service or services running on a computer, server, or in a cloud environment through, e.g., an encrypted bundle. In some examples, a combination or mixed environment of conditional and unconditional access may be employed.

As used throughout the present disclosure, a composite document may comprise a digital document that contains content-parts that may have been encrypted and signed to substantially prevent unauthorized access and/or modification to the content-parts. The content-parts may comprise a variety of individually addressable and accessible parts in the form of separate files or addressable file fragments. For example, the content-parts may include individual files, groups of files, or file fragments including, e.g., HTML tags, XML nodes and elements, word processing pages, spreadsheet cells, presentation slides, an electronic object containing drawings, an electronic object having video capabilities, etc., and/or combinations of different types of file parts.

In one example, a composite document may be publicly-posted, in another example, a composite document may be used, e.g., privately or internally within an enterprise, and/or in mixed workflows (inter or intra-organization).

Access to a composite document may also be based on conditions or rules processed in coordination with the use of a secure content manager and/or a trusted agent, as discussed below in more detail. In one example, composite document workflow participants (or "participants" or "users") may be provided with initial/high-level access to a composite document without the need to retrieve or process additional conditions or rules through a trusted agent, but may require access to a trusted agent for further access. For example, a participant may be presented with a Table of Contents for a composite document, but require a trusted agent to verify, e.g., through a secure content manager, that the participant meets certain rules or conditions prior to allowing access to secure content-parts other than the Table of Contents. In some examples, a rule may comprise a reference identifier linking to an externally-stored rule.

In some examples, the trusted agent may release a key or token or other credential upon verification to grant access to the secure content-part or parts in a secure content manager. In some examples, the trusted agent may also delegate verification of whether a participant meets certain rules or conditions to a trusted engine, discussed below in more detail. In some examples, the key or token may be combined with the conditions and rules discussed above into a bundle, e.g., an encrypted bundle.

Figure 1:
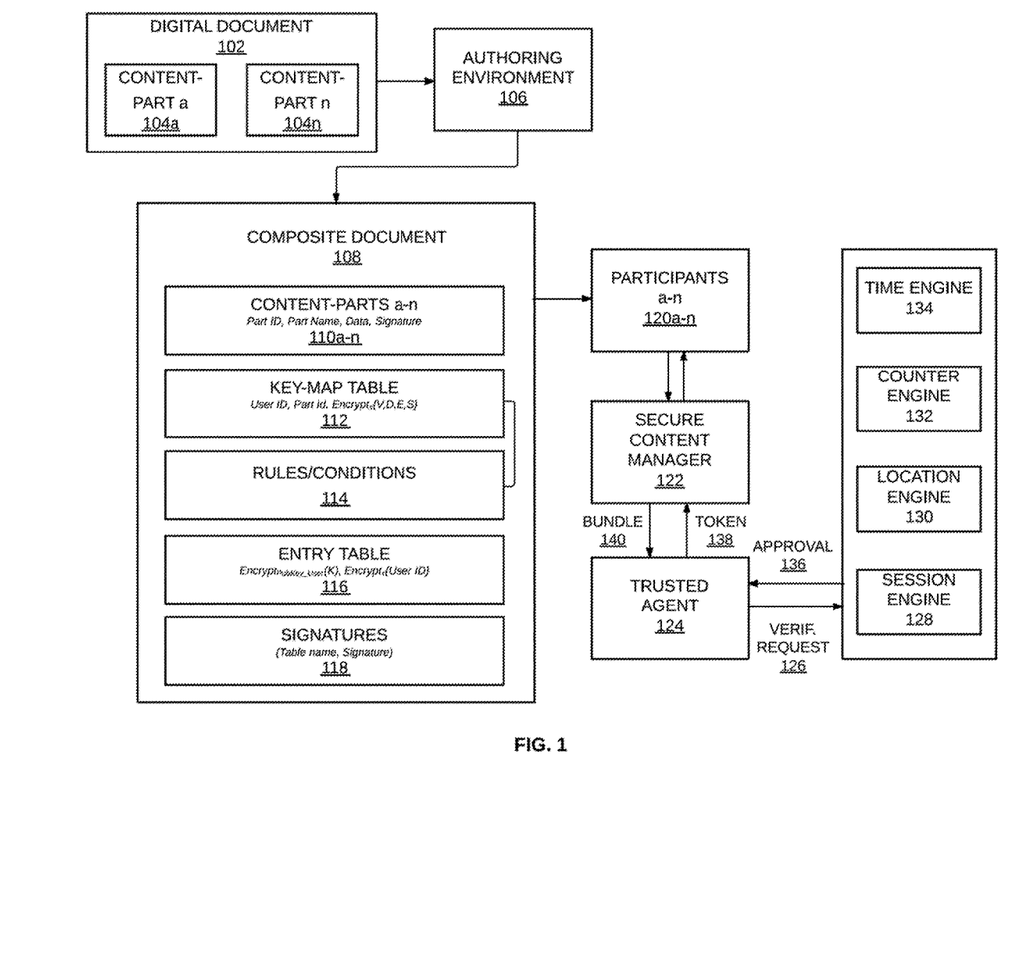
FIG. 1 illustrates a simplified block diagram of a digital document workflow, according to an example of the present disclosure.

FIG. 1 illustrates a simplified block diagram of a digital document workflow, according to an example of the present disclosure. It should be understood that the diagram depicted in FIG. 1 represents a generalized illustration and that other components may be added, or existing components may be removed, modified, or rearranged without departing from the overall scope of the digital document workflow 100.

The digital document workflow 100, in an example, includes a digital document 102, an authoring environment 106, a composite document 108, participants 120*a-n*, a secure content manager 122, a trusted agent 124, and verification engines 128-134 for time data, counter data, location data, and session data. Composite document 108 is depicted as containing an exemplary plurality of secure content-parts 110*a-n* and an exemplary plurality of encrypted key-map entries in a key map table. As used herein, the term "secure" is intended to denote that the content-parts 110*a-n* and the key-map entries in the key map table are encrypted and/or signed.

Content-parts 104*a-n*, in an example, may represent individually addressable or separable elements within digital document 102. For example, content-parts 104a-n may be lines, paragraphs, text boxes, cells, rows, columns, graphics, or other objects such as a fillable text field or signature box. The content-parts 104a-n may also be extended to the byte level, for instance, as different elements of the same file. As another example, the content-parts 104a-n may comprise logical aggregations of parts from multiple digital documents.

As discussed in more detail below, authoring environment 106, secure content manager 122, trusted agent 124, time-based constraint verification engine 134, counter-based verification engine 132, location-based verification engine 130, and/or session-based verification engine 128 may comprise hardware devices such as computers, servers, databases, processors, memory, and/or circuits, etc., configured with machine readable instructions to perform various functions in the digital document workflow 100. In addition, or alternatively, the components may comprise machine-readable instructions stored on computer-readable media.

In an example, authoring environment 106 may package, encrypt, and sign the content-parts 104a-n of digital document 102 such that the resulting secure content-parts 110a-n (in master form) cannot be accessed unless the participants 120a-n have the appropriate keys to access the secure content-parts 110a-n (in distribution form). More specifically, authoring environment 106 may generate, or derive, needed encryption and signature keys to encrypt and sign the content-parts 104a-n into secure content-parts 110a-n. Moreover, in an example, participants 120a-n may be required to use different sets of keys to read and/or write to composite document 108.

In addition, authoring environment 106 may allow for the creation or editing of rules and/or conditions associated with a particular composite document 108, and may embed such rules and/or conditions into the composite document 108, e.g., into rules/conditions 114, or directly into key-map table 112, or may store or access the rules/conditions 114 externally, e.g., in a database. Rules/conditions 114 may also be packaged in a bundle, e.g., bundle 140, discussed in more detail below.

As discussed above, composite document 108, in an example, may comprise secure content-parts 110a-n and an exemplary plurality of encrypted key-map entries in a key map table 112. Access to secure content-parts 110a-n by participants 120a-n may be controlled through distribution of various sets of keys contained in respective key-map entries in key map table 112 for the participants. More particularly, a subset of the entries may be contained in key-map entries within a composite document, with at least one key-map entry for each participant. Key-map table 112 may also comprise a user ID, which may be random or sequential, and a part ID, wherein every content-part may be given a set of keys. The key-map table may be queried by, for example, the user ID to retrieve all entries for the user ID encrypted by the user's secret key, e.g., K in entry table 116.

More specifically with respect to key-map entries, key-map table 112 may contain key-map entries containing respective sets of keys to be used by respective participants 120a-n in decrypting and verifying signatures of content-parts 110a-n for respective content access sessions. Moreover, the key-map entries in key-map table 112 may contain respective sets of keys that enable the participants 120a-n to attain various levels of access to content-parts 110a-n.

Conditions and/or rules, i.e., those created in authoring environment 106, derived from or stored in a database (not shown), or derived from another source may also later be stored in composite document 108 as conditions/rules 114, in an example, and further stored or transmitted in a bundle, such as encrypted bundle 140, either alone or in combination with other data, e.g., a token such as token 138. In an example, bundle 140 may only be accessible by trusted agent 124.

In another example, conditions and/or rules may be stored in an external database, with a unique identifier or other mechanism used to associate a condition and/or rule with a composite document, workflow participant, workflow step, and/or other data related to the workflow or workflow security.

Data stored in entry table 116 and signatures 118 may comprise additional information needed to decrypt, encrypt, verify, or otherwise authenticate secure content-parts of composite document 108. As mentioned above, the various secure content-parts may be combined together through various serialization mechanisms, such as a Java jar-archive, an HP DLF file, or other file types.

Participants 120a-n may represent exemplary computing devices through which participants 120a-n receive or initially access a composite document 108. When granted sufficient access, participants 120a-n may also view, edit, copy, print, and/or acknowledge receipt of a composite document 108. The computing devices may comprise, for instance, personal computers, desktop computers, laptop computers, tablet computers, personal digital assistants, cellular telephones, smartphones, and consumer electronic devices, etc.

Authoring environment 106, discussed above, may be in a secure environment where the owner, creator, or master of digital document 102 has access to the authoring environment 106, but where at least one of the computing devices of participants 120a-n is outside of the secure environment. For example, some or all of the participants 120a-n may not be granted access to the secure environment of the authoring environment 106 in instances where such access is impractical or prohibited. In such cases, some or all of the participants 120a-n may not access a composite document 108 from an authoring environment 106 or a common database that controls access to the composite document 108. Instead, the composite document 108 may be supplied to and among the participants 120a-n through, for instance, e-mail, a shared server, direct file transfer, removable storage media, or cloud service, etc.

Accordingly, in an example, workflow 100 also comprises a secure content manager 122 to allow participants to access secure content-parts of a composite document 108. For example, secure content manager 122 may comprise or include a front-end software tool or graphical user interface ("GUI") for accessing a composite document 108.

In an example, secure content manager 122 receives a composite document 108 through the workflow of participants 120a-n. It will be understood that secure content manager 122 may be positioned between any of the participants 120a-n in the workflow as well as between multiple participants 120a-n. Secure content manager 122 may be run as software, a service, or a combination of software and services accessible by, e.g., participants 120a-n on participant devices, e.g., laptops, desktops, or other devices.

During the workflow 100, in one example, secure content manager 122 may receive a composite document containing a key-map entry for a participant 120a-n, in which the key-map entry has been encrypted using a key of participant 120a-n. In addition, the secure content manager 122 may decrypt the encrypted key-map entry using a key. In an example, the key may be a secret, symmetric key for both encryption and decryption. In an example, the composite document or a content-part may be authenticated before decryption.

In an example, each of the key-map entries may be encrypted using a symmetric key generated or derived for the respective participants 120a-n and with the symmetric keys encrypted using the respective public keys of the participants. In this example, the secure content manager may receive a composite document 108 containing a key-map entry for a participant, in which the key-map entry has been encrypted using a symmetric key and in which the symmetric key has been encrypted using a key, e.g., a public key with the private key known to a participant. According to an example, the symmetric keys may be combined into an entry table, e.g., entry table 116, that indicates which of the symmetric keys are associated with which of the participants 120a-n to enable the participants to quickly identify which of the symmetric keys may be decrypted using their respective private keys.

In either of the above two examples, prior to these operations, secure content manager 122 may authenticate a participant; establish a corresponding trusted public key for a participant; function as a document security and safety checkpoint; backup the composite document 108 at various points along the workflow; timestamp the composite document 108 at various points along the workflow; scan a part of the composite document 108 that is exclusively accessible by the secure content manager 122 to determine if composite document 108 is in compliance with the security compliance rules; and/or verify rules and/or conditions relating to a participant as discussed in more detail below.

In an example, the digital document workflow 100 may also include a trusted agent 124, which may communicate with engines, e.g., time-based constraint verification engine 134, counter-based verification engine 132, location-based verification engine 130, and/or session-based verification engine 128. Trusted agent 124 may be an external service, i.e., located external to a participant device, and/or not accessible to a workflow participant. In other words, a workflow participant may not be able to access the trusted agent 124 or release keys from trusted agent 124, to keep trusted agent 124 isolated and protected.

In an example, the trusted agent 124 may access or read rules and conditions and use the rules and conditions to "just in time" verify access for a particular participant 120a-n. As discussed in more detail below, the rules and conditions may be stored or embedded into composite document 108, e.g., as rules/conditions 114 or within key-map table 112, may be in bundle 140, may be already known to or accessible by trusted agent 124, or may be stored in an external database. For purposes of simplicity, conditions and rules are referred to herein simply as the "rules and conditions 114" of composite document 108, although the rules and conditions may be stored external to composite document 108 in some examples.

According to some examples, trusted agent 124 has access only to the rules and conditions but may not have access to key-map entries with access keys to content-parts, i.e., trusted agent 124, in some examples, may be restricted from accessing content-parts. As discussed above, trusted agent 124 may have access to bundle 140 directly from composite document 108 without access to the key-map entries, while in another example, participants 120a-n or secure content manager 122 may access the bundle 140 from composite document 108 and transmit the bundle 140 to trusted agent 124 for decryption. In the event that bundle 140 is retrieved from a composite document 108 by a workflow participant and sent to the trusted agent 124 by the workflow participant, the trusted agent 124 may require bundle 140 to be signed by a document master key. A signature, which may be generated by a document owner or document master private key, may be embedded in composite document 108 and may also be retrieved from composite document 108. In such an example, trusted agent 124, for security purposes in some examples, may not attempt to decrypt a bundle 140 that it cannot first verify.

In various examples, different rules and conditions may be assigned for each participant 120a-n for different groups of participants for all workflow participants, per content-part, and/or per workflow step, and rules may be shared across different dimensions. Conditional access may be associated with an action, e.g., a read action or write action, and actions may be time-restricted or restricted based on other rules or conditions. Rules and conditions may be joined by OR/AND operators, or may default to an AND operator. For security reasons, rules and conditions may be non-executional and provided in a declarative, i.e., descriptive, form with a set of relevant parameters. An individual constraint may be expressed in any binary, xml, textual, tabulated or other form. According to one example, a constraint may include the following illustrative fields:

[condition_code] [parameters] [action] [default action] [release_token]

In one example, the condition_code field may be a unique identifier of a condition or rule to be verified or enforced by the trusted agent 124. A default action may be provided if condition_code is unrecognized or currently unsupported.

In another example, release_token is a one-time nonce that may be released by trusted agent 124 if a rule or condition, specified by condition_code and/or parameters, is met. In an example, release_token, e.g., token 138 of FIG. 1, is a randomly generated long number that is released by trusted agent 124 and used by secure content manager 122 to access a bundle 140 to access a key in composite document 108.

In an example, a participant's key-map entry may be XORed with the release token before or after being encrypted by participant's key. In another example, if more than one rule or condition is to be met, the release token may be split between one or more trusted agents 124 or one or more verification engines 128-134, such that each entity releases a part of the release token that can be reassembled.

In one example, rules and conditions are created in declarative or descriptive form, e.g., a non-executable mode, and are accessible only by a document creator or master and/or by an assigned trusted agent(s). In another example, where sufficient trust, e.g., by bundle 140 being signed, has been established between a document master and a trusted agent 124, executable constraints may be set run-time, allowing any executable code to be securely included into a composite document 108. In such an example, a document master may be allowed to add an executable condition that is executed by a trusted agent 124 and/or metadata.

As discussed in more detail below, in an example, trusted agent 124 may rely on the external verification engines 128-134 to verify rules and conditions for a particular participant 120a-n. In response to a verification, trusted agent 124 may return a token or a key, e.g., token 138 which may be from bundle 140, to secure content manager 122 which may be used to grant access to a composite document 108 for a participant 120a-n. In some examples, the token may be a key or a key-map recovery token, e.g., a key to decrypt a key-map of a workflow participant, or a first or second key in cases where a key-map is encrypted twice, or a half key in cases where a participant has half a key, with the other half-key released by a trusted agent to be combined to decrypt a workflow participant's key-map.

External engines 128-134 represent four exemplary engines that may be used in combination with secure content manager 122.

Time-based constraint verification engine 134, in an example, is an external trusted time server to determine the current time of an event and then compare the time to set roles and conditions 114 in composite document 108 to grant or deny access through trusted agent 122. For example, time-based rules or conditions 134 may include a) time restrictions based on specified periods of access based on day or time, e.g., access may be granted on weekdays during business hours (e.g., 9 AM through 5 PM), but not on weekends; b) time restrictions based on deadlines, e.g., where access is granted only if the current time of a composite document access request is prior to a preset deadline; or c) other time restrictions based on a particular or pre-defined business need.

Counter verification engine 132, in an example, is an external trusted counter server to determine whether a preset number of access requests to a composite document 108 have been granted. In an example, a maximum number of composite document access requests is determined, with counter engine 132 decrementing the remaining number of access requests with each new access grant. Upon reaching a zero state, counter engine 132 will no longer permit trusted agent 124 to grant access to a given composite document 108.

In an example, counter engine 132 may create, store, or access a transaction record or log of access. In some examples, counter engine 132 may create, store, or access a transaction record or log of access in an external database using a reference to a counter in a composite document to, e.g., prevent counter manipulation in a composite document by a workflow participant with, e.g., older versions of a composite document that have not exhausted a counter. In another example, a participant 120a-n may also be prompted to confirm the access request, e.g., by entering a password or clicking an acknowledgment button to be informed of the counter-based verification and/or the remaining number of times a composite document 108 may be accessed. In yet another example, each participant 120a-n may be granted a set number of times that a composite document 108 can be accessed, while in another example participants 120a-n may be tracked as a whole or segmented into groups, with each group granted a set number of times that a composite document 108 can be accessed.

Location verification engine 130, in an example, is an external trusted location server to determine whether a participant 120a-n has requested access to a composite document 108 from a particular known location, or a location from which access to as composite document 108 is permitted. For example, location engine 130 may comprise identifiable geographical information or may connect to a GPS server or internet protocol (IP) address lookup table to determine if a particular participant is requesting access from an office location, a home location, or an unknown or untrusted location. In an example, "black lists" or "white lists" of GPS locations, IP addresses, MAC addresses, or other uniquely identifable information may also be stored in location engine 130 or a database accessible by location engine 130.

In another example, location engine 130 may permit access to a composite document 108 if the participant location is within a certain distance, e.g., within a preset number of meters from a particular or trusted location, to allow for a reasonable amount of error or travel. Similarly, in an example, location engine 130 may continuously monitor participant location information while access to a composite document 108 is active, and may instruct trusted agent 112 to disable access, or revoke token/key 138, if the participant that has current access to a composite document 108 leaves the trusted location.

Session-based verification engine 128, in an example, is an external trusted session server to determine whether a participant 120a-n that has requested access to a composite document 108 has authenticated, has not authenticated, or has authenticated but is now in an expired or "timed-out" session. Session engine 128 may comprise an internal or external directory or authentication engine, such as an LDAP server or an RSA server. Expiration of authentication may also be handled in coordination with time engine 134, discussed above.

In various examples, a participant 120a-n may be required to be authenticated once per session, and re-authenticated if a session is expired. In such an example, a newly generated session token may be placed into a restricted area of a composite document 108, accessible only by a trusted agent 124. On every new access by a participant 120a-n, the existing token may be verified for session expiry and, if expired, participant 120a-n may be required to re-authenticate, with a newly generated token replacing the expired one.

Figure 2:
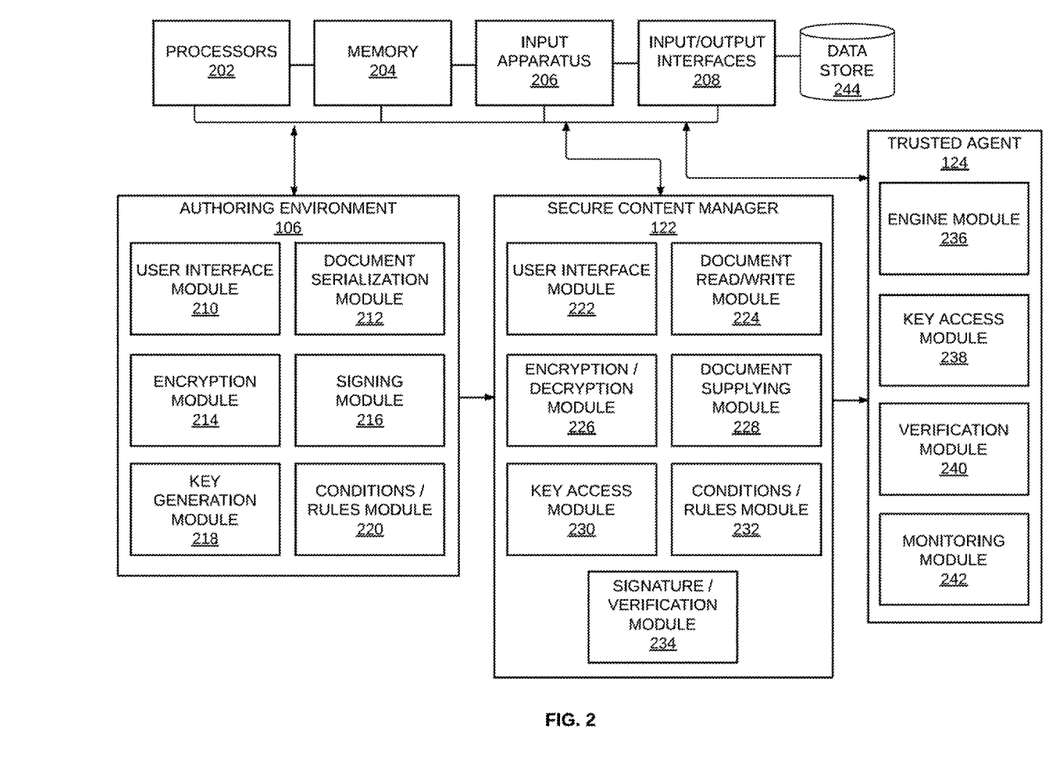
FIG. 2 illustrates a simplified block diagram of a digital document system including an authoring environment, a secure content manager, and a trusted agent, according to an example of the present disclosure.

FIG. 2 illustrates a simplified block diagram of a digital document system including an authoring environment, a secure content manager, and a trusted agent, according to an example of the present disclosure.

Figure 3:
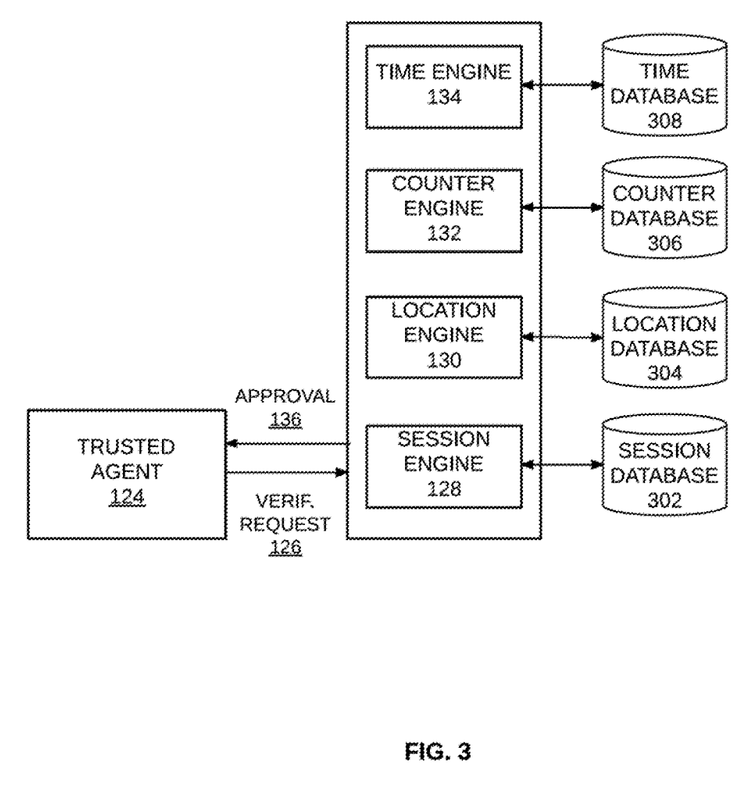
FIG. 3 illustrates a simplified block diagram of trusted agent an associated engines, according to an example of the present disclosure.

It should be understood that the block diagram depicted in FIG. 2 (and later in FIG. 3) represents generalized illustrations and that other components may be added, or existing components removed, modified, or rearranged, without departing from the scope of the systems of FIGS. 2 and 3.

As shown in FIG. 2, authoring environment 106 may include, in an example, a user interface module 210, a document serialization module 212, an encryption module 214, a signing module 216, a key generation module 218, and a conditions/rules module 220. Aside from the other operations of an authoring environment, including those discussed herein, the modules may support a user interface, adding (or "serializing") content parts into a composite document, encrypting content-parts or an entire composite document, signing content-parts or an entire composite document, generating keys for use in a composite document, and storing conditions or rules for granting access to a composite document.

Secure content manager 122 may include, in an example, a user interface module 222, a document read/write module 224, an encryption/decryption module 226, a document supplying module 228, a key access module 230, a conditions/rules module 232, and a signature/verification module 234. Aside from the other operations of a secure content manager, including those discussed herein, the modules may support a user interface, reading and writing or re-writing content-parts of a composite document into a composite document after editing, encrypting and decrypting content-parts, supplying or presenting content-parts or an entire composite document, accessing keys for use in a composite document, processing conditions or rules for granting access to a composite document, alone or in coordination with a trusted agent, and/or signing or verifying.

Trusted agent 124 may include, in an example, an engine module 236, a key access module 238, a verification module 240, and a monitoring module 242. Aside from the other operations of a trusted agent, including those discussed herein, the modules may support communications with verification engines (e.g., engines 128, 130, 132, and/or 134), accessing keys for use in a composite document, verifying or processing conditions or rules for granting access to a composite document, and continuously monitoring access to a composite document once access has been granted.

The modules 210-220, 222-234, and 236-242 may comprise modules containing machine readable instructions, hardware modules, or a combination of modules containing machine readable instructions and hardware modules. Thus, in one example, at least one of the modules 210-220, 222-234, and 236-242 comprise circuit components. In another example, at least one of the modules 210-220, 222-234, and 236-242 comprise machine readable instructions stored on a computer readable storage medium, which is executable by a processor.

The authoring environment 106, secure content manager 122, and trusted agent 124 may be implemented and/or executed by a respective processor or processors 202, which may be coupled to memories 204, input apparatus 206, and input/output interfaces 208. Thus, for instance, authoring environment 106 may comprise an integrated and/or add-on hardware device of a computing device comprising a processor 202. As another example, the secure content manager 122 may comprise a computer readable storage device upon which machine readable instructions for each of the modules 222-234 are stored and executed by a processor 202, which may be coupled to a memory 204.

In an example, data store 244 may comprise databases, and may be used to store data associated with authoring environment 106, secure content manager 122, and/or trusted agent 124. For example, data store 244 may store one or more of a) specially generated derived keys assigned for each secure content-part 110a-n and used to encrypt and sign the content-parts; b) the private decryption key of the secure content manager 122, which the secure content manager 122 may use to decrypt the key-map entries of composite documents, as well as the signature-verification key, which the secure content manager 122 may use to verify the signatures of the key-map entries; and c) other keys used to encrypt or decrypt the content-parts 110a-n and verify the authenticity of the content-parts.

In an example, the data store 244 may comprise a hard disk or solid state disk, or volatile and/or non-volatile memory, such as DRAM, EEPROM, MRAM, phase change RAM (PCRAM), Memristor, and flash memory, etc. In addition, or alternatively, the data store 244 may comprise devices to read from and write to a removable media, such as a CD-ROM, a DVD-ROM, or other optical or magnetic media.

The authoring environment 106, secure content manager 122, and trusted agent 124 may communicate directly with each other, or through input/output interfaces, e.g., interfaces 208, or through the use of tokens or keys, e.g., token 138, or other means of digital communication. As discussed above, trusted agent 124 may also communicate with one or more engines, e.g., time-based constraint verification engine 134, counter-based verification engine 132, location-based verification engine 130, and/or session-based verification engine 128.

FIG. 3 illustrates a simplified block diagram of trusted agent and associated verification engines, according to an example of the present disclosure. Each of the one or more engines, e.g., time-based constraint verification engine 134, counter-based verification engine 132, location-based verification engine 130, and/or session-based verification engine 128, may be coupled to or communicate with one or more servers or databases, e.g., time database 308, counter database 306, location database 304, and/or session database 302.

In an example, time store 308 may store or retrieve, e.g., from an atomic clock or other source, current time information for both local and other time zones. In another example, counter store 306 may store or retrieve a count or log or transaction history of access attempts to a particular composite document 108. In another example, location store 304 may store or retrieve GPS coordinates, IP address information, MAC address information, or other information for identifying a participant by geographic location. In another example, session store 302 may store or retrieve information relating to session authentication of a particular participant.

Figure 4:
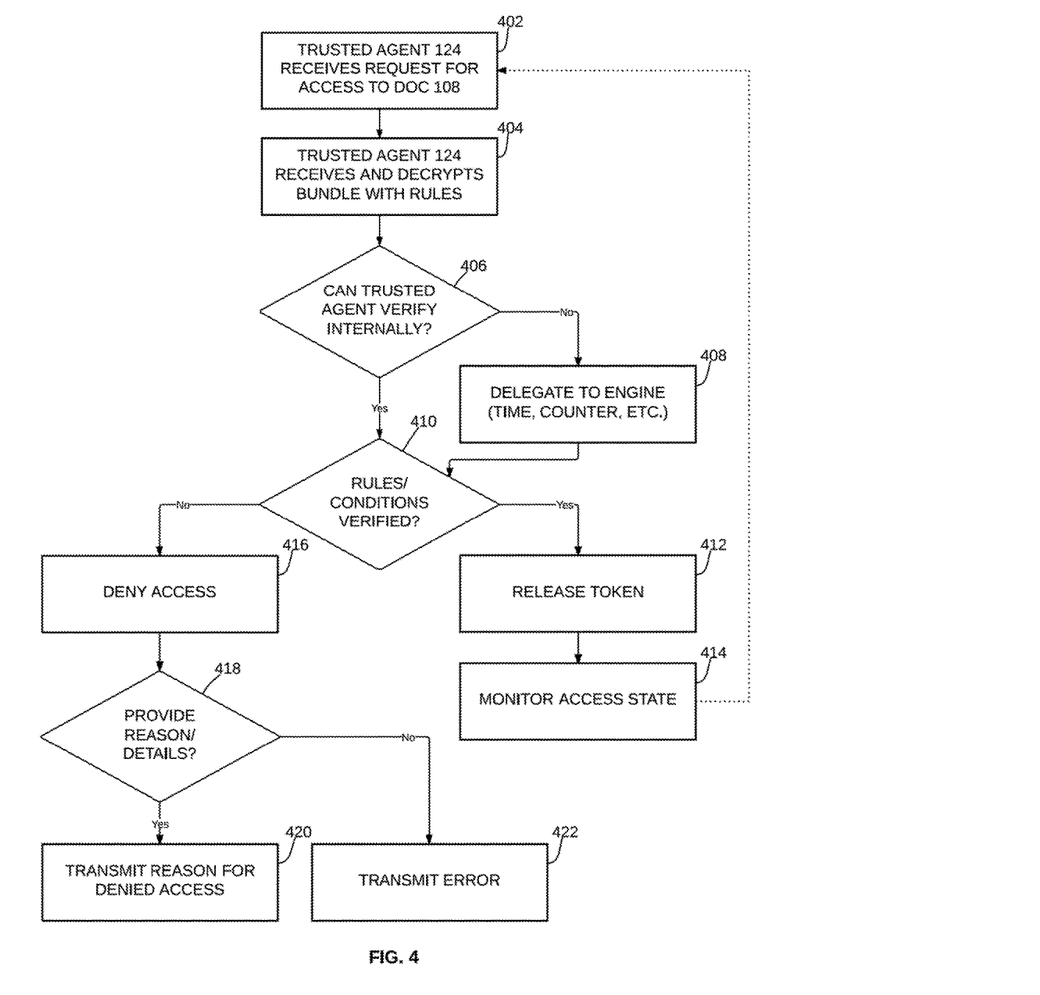
FIG. 4 illustrates a flow diagram of accessing a secure content-part of a composite document based on rules and/or conditions, according to an example of the present disclosure.

FIG. 4 illustrates a flow diagram of accessing a secure content-part of a composite document based on rules and/or conditions, according to an example of the present disclosure.

In block 402, in an example, trusted agent 124 receives a request for access to composite document 108 from, e.g., secure content manager 122, workflow participant 120a-n, or other component of document workflow 100.

In block 404, trusted agent 124 retrieves and/or receives the rules and conditions, e.g., rules and conditions 114. As discussed below with respect to FIG. 5, the rules and conditions may be accessed from one or more sources. For example, rules and conditions may be embedded into an encrypted bundle, e.g., bundle 140 of FIG. 1, which trusted agent 124 may decrypt. Bundle 140 may also comprise a release token, e.g., token 138, as discussed below in more detail with respect to block 412.

In block 406, trusted agent 124 determines if it can verify rules and conditions for a participant without querying a separate engine, e.g., without accessing or delegating to time-based constraint verification engine 134, counter-based verification engine 132, location-based verification engine 130, and/or session-based verification engine 128. If trusted agent 124 may not do so based on internal data, the flow of FIG. 4 proceeds to block 408, where the verification is delegated to an engine. Delegated engines 128-134 may be trusted or authenticated to trusted agent 124.

In block 410, trusted agent 124 ascertains or verifies whether the participant satisfies the retrieved rules and conditions. It will be understood that one or more rules and conditions may need to be satisfied in block 410 using one or more trusted agents 124. If all rules and conditions are satisfied, flow proceeds to block 412, where trusted agent 124 releases a token, e.g., a key-map recovery token from bundle 140, to secure content manager 122, and the participant is given access to the composite document 108 or to the requested secure content-part. In an example, the key-map recovery token may be token 138 of FIG. 1, may be a key, or may be a randomly generated long number, and may have been stored or transmitted in bundle 140.

In block 414, in an example where the rules and conditions are satisfied and access is granted, trusted agent 124 may further monitor the access state for on-going rules, conditions, and/or constraints. In the event that any constraints are no longer satisfied, for example if a fixed access time has expired, trusted agent 124 may withdraw access by, e.g., revoking token or key 138. In an example, a participant may be given an early warning as to an impending withdrawal of access to, e.g., save the latest changes to a content-part 110a-n or to composite document 108.

If a participant does not satisfy a combined rule and condition retrieved from, e.g., bundle 140, flow proceeds to block 416 where the trusted agent 124 denies access to a content-part 110a-n or to composite document 108. In an example, if desired, e.g., in block 418, a detailed message with reasons for the denied access may be transmitted or displayed to the participant in block 420, such as an invalid time condition or failure to meet a GPS rule. In other examples, for increased security as depicted in block 422, block 418 may determine that no error will be returned, or will simply return an error lacking detail as to the reason that trusted agent 124 or secure content manager 122 did not grant access.

In the event that trusted agent 124 or one or more of verification engines 128-134 are down or inaccessible, composite document 108 or secure content manager 122 may be configured to automatically prohibit access, to allow temporary access to certain secure content-parts, e.g., to parts with certain preset security levels or at certain times, or to perform some other default action.

Figure 5:
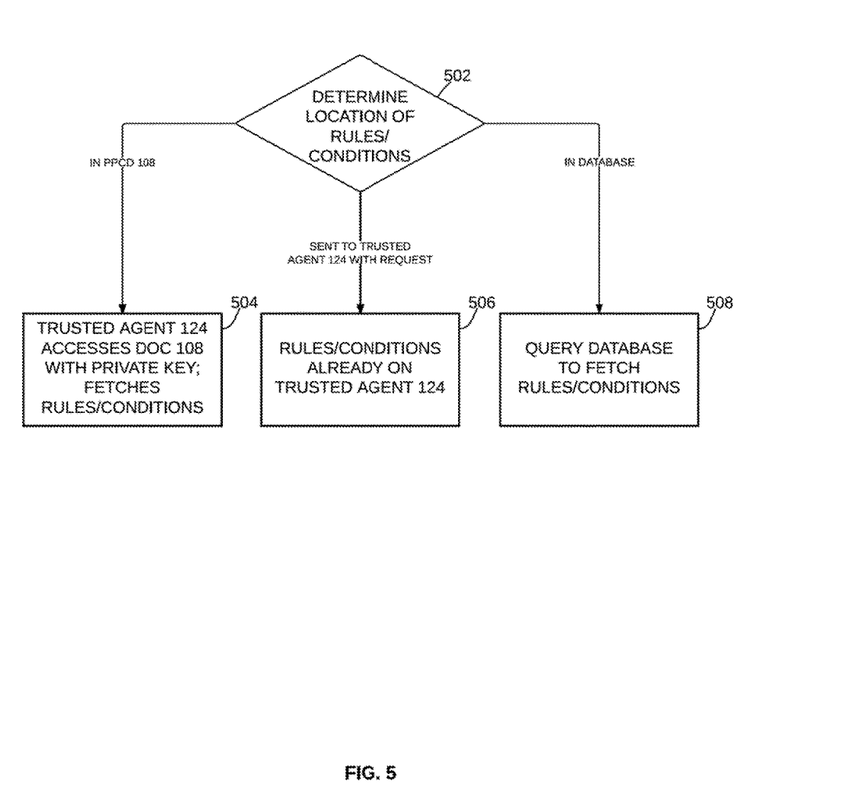
FIG. 5 illustrates a flow diagram of accessing a secure content-part of a composite document based on rules and/or conditions stored in various locations, according to an example of the present disclosure.

FIG. 5 illustrates a flow diagram of accessing a secure content-part of a composite document based on rules and/or conditions stored in various locations, according to an example of the present disclosure.

In an example, block 502 determines where rules and conditions are stored. In an example where the rules and conditions are stored in a composite document, e.g., rules and conditions 114 of composite document 108, trusted agent 124 accesses composite document 108 using a private key and retrieves the rules and conditions, e.g., rules and conditions 114, for a particular participant 120a-n. The rules and conditions may be in, e.g., bundle 140 or may be packaged into bundle 140 for transmission to trusted agent 124 with a token.

In an example where the rules and conditions are stored on a trusted agent 124 or already sent to trusted agent 124, e.g., by secure content manager 122, trusted agent 124 may access the local rules and conditions without the need to access composite document 108 with a key.

In an example where the rules and conditions are stored on an external database, trusted agent 124 may query the database to fetch the rules and conditions based on, e.g., a document ID or reference ID retrieved from a bundle 140.

Figure 6:
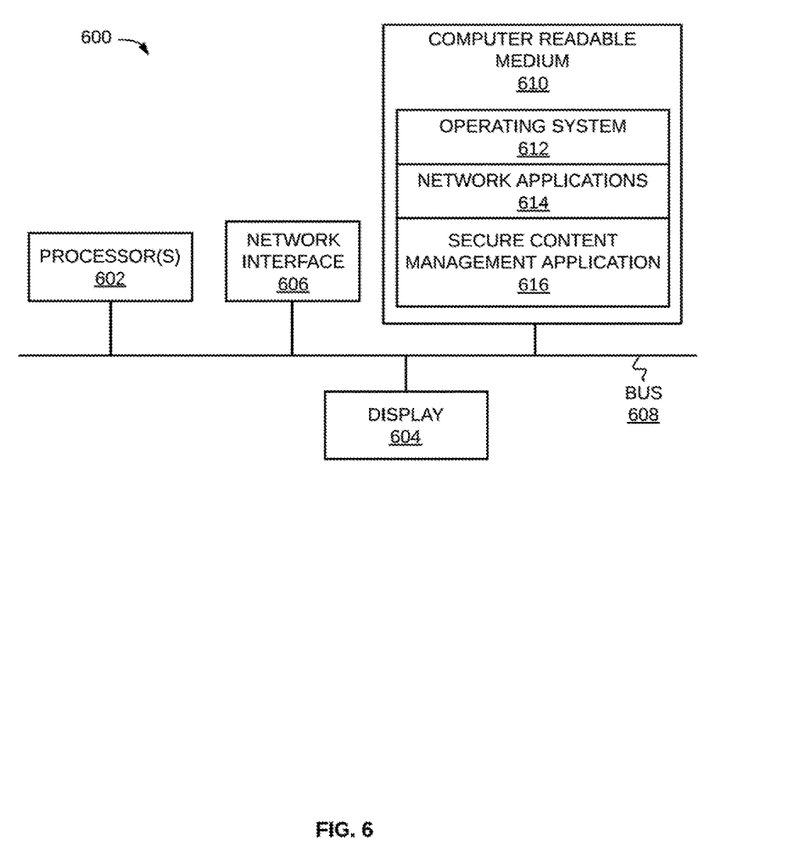
FIG. 6 illustrates a schematic representation of a computing device that may be used as a platform for implementing or executing at least one of the processes depicted in FIGS. 4 and 5, according to an example of the present disclosure.

FIG. 6 illustrates a schematic representation of a computing device that may be used as a platform for implementing or executing at least one of the processes depicted in FIGS. 4 and 5, according to examples of the present disclosure.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats.

Computing device 600 may represent a computing device that comprises authoring environment 106, secure content manager 122, and/or trusted agent 124. The device 600 may include a processor 602 such as a central processing unit; a display device 604, such as a monitor or other digital display; a network interface 606, such as a Local Area Network LAN card, a wireless 802.11x LAN card, a 3G or 4G mobile WAN or a WiMax WAN card; and a computer-readable medium 610. Each of these components may be operatively coupled to a bus 608. For example, the bus 608 may be EISA, PCI, USB, FireWire, NuBus, or PDS.

The computer readable medium 610 may be any suitable medium that participates in providing instructions to the processor(s) 502 for execution. For example, the computer readable medium 610 may be non-volatile media, such as an optical or a magnetic disk; and volatile media, such as memory. Transmission media can also take the form of acoustic, light, or radio frequency waves. The computer readable medium 610 may also store other machine-readable instructions, including instructions downloaded from a network or the internet.

The computer-readable medium 610 may also store an operating system 612, such as Microsoft Windows, Mac OS, Unix, or Linux; network applications 614; and a secure content management application 616. The operating system 612 may be multi-user, multiprocessing, multitasking, multithreading, real-time, and the like. The operating system 612 may also perform basic tasks, such as recognizing input from input devices, such as a keyboard or a keypad; sending output to the display 604; keeping track of files and directories on medium 610; controlling peripheral devices, such as drives, printers, or image capture devices; and managing traffic on the bus 608. The network applications 614 may include various components for establishing and maintaining network connections, such as machine readable instructions for implementing communication protocols including but not limited to TCP/IP, HTTP, Ethernet, USB, and FireWire.

The authoring environment 106, secure content manager 122, and/or trusted agent 124 may provide various machine readable instructions for managing access to secure content, as described above. In certain examples, some or all of the processes performed may be integrated into the operating system 612. In certain examples, the processes may be at least partially implemented in digital electronic circuitry, in computer hardware, in machine readable instructions such as firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims, and their equivalents, in which all terms are meant in their broadest reasonable sense unless otherwise indicated.

What is claimed is:

1. A method of accessing a secure content-part of a composite document, said method comprising:
receiving, on a first computer system, at least one request by at least one workflow participant from a second computer system to access a composite document comprising the secure content-part, wherein the secure content-part is an individually addressable element of a plurality of content-parts within the composite document;
retrieving, on the first computer system, at least one encrypted bundle from the composite document for the at least one workflow participant;
decrypting, on the first computer system, the at least one encrypted bundle into a decrypted bundle using a private key;
ascertaining, on the first computer system, whether at least one rule retrieved from the decrypted bundle is satisfied, wherein, when the least one rule is satisfied, the first computer system is to release a token from the decrypted bundle to the second computer system to access the secure content-part of the composite document; and accessing, by the first computer system, a key map of the composite document with the token, wherein the accessing comprises:

querying the key map with the token and a user identification of the at least one workflow participant;

retrieving entries in the key map associated with the user identification; and providing levels of access to the secure content-part of the composite document associated with the entries that are retrieved for the user identification.

2. The method according to claim 1, wherein the at least one rule comprises a reference identifier.

3. The method according to claim 1, wherein the first computer system accesses the composite document directly to retrieve the at least one encrypted bundle.

4. The method according to claim 1, wherein the first computer system retrieves the encrypted bundle from the second computer system.

5. The method according to claim 1, wherein the token is a key-map recovery token.

6. The method according to claim 1, wherein the token is a key-map decryption token.

7. The method according to claim 1, wherein the token is a partial key for decrypting a key-map of the at least one workflow participant.

8. The method according to claim 1, wherein the first computer system accesses a verification engine.

9. A computer system comprising:

a content manager to receive, from a workflow participant, at least one request to access a secure content-part of a composite document, wherein the secure content-part is an individually addressable element of a plurality of content-parts within the composite document;

a trusted agent to receive at least one encrypted bundle from the composite document for the at least one workflow participant, to decrypt the encrypted bundle into a decrypted bundle, and to determine whether the at least one workflow participant satisfies at least one rule;

a key module to release at least one token from the decrypted bundle, wherein the at least one token is to access a key map of the composite document, wherein the key map is to query the key map with the token and a user identification of the at least one workflow participant, retrieve entries in the key map associated with the user identification, and provide levels of access to the secure content-part of the composite document associated with the entries that are retrieved for the user identification; and a processor to implement the content manager, the trusted agent, and the key module.

10. The system according to claim 9, wherein the at least one rule comprises a reference identifier.

11. The system according to claim 9, wherein the trusted agent accesses the composite document directly and retrieves the at least one encrypted bundle.

12. The system according to claim 9, wherein the trusted agent retrieves the encrypted bundle from the workflow participant.

13. The system according to claim 9, wherein the token is a key-map recovery token.

14. The system according to claim 9, wherein the token is a key-map decryption token.

15. The system according to claim 9, wherein the token is a partial key for decrypting a key-map of the workflow participant.

16. The system according to claim 9, wherein the trusted agent accesses a verification engine.

17. A non-transitory computer readable storage medium on which is embedded a computer program, said computer program to manage access to a secure content-part of a composite document, said computer program comprising a set of instructions to:

receive at least one encrypted bundle from the composite document for at least one workflow participant, wherein the composite document comprises a secure content-part that is an individually addressable element of a plurality of content parts within the composite document;

decrypt the at least one encrypted bundle into a decrypted bundle using at least one private key;

ascertain whether at least one rule retrieved from the decrypted bundle is satisfied, wherein, when at least one rule is satisfied, the instructions are to release a token from the decrypted bundle to the at least one workflow participant to access the secure content-part of the composite document; and access a key map of the composite document with the token wherein the instructions to access comprises instructions to:

query the key map with the token and a user identification of the at least one workflow participant;

retrieve entries in the key map associated with the user identification;

provide levels of access to the secure content-part of the composite document associated with the entries that are retrieved for the user identification.

* * * * *

UNITED STATES PATENT AND TRADEMARK OFFICE
CERTIFICATE OF CORRECTION

PATENT NO. : 10,360,389 B2
APPLICATION NO. : 15/307015
DATED : July 23, 2019
INVENTOR(S) : Vali Ali et al.

Page 1 of 1

It is certified that error appears in the above-identified patent and that said Letters Patent is hereby corrected as shown below:

In the Claims

In Column 12, Line 66, Claim 1, delete "least" and insert -- at least --, therefor.

Signed and Sealed this
Nineteenth Day of November, 2019

Andrei Iancu
*Director of the United States Patent and Trademark Office*